(12) United States Patent
Kusakabe

(10) Patent No.: US 8,224,105 B2
(45) Date of Patent: Jul. 17, 2012

(54) METHOD FOR CODING IMAGE, IMAGE CODING DEVICE AND IMAGE PICKUP SYSTEM

(75) Inventor: Toshihiko Kusakabe, Osaka (JP)

(73) Assignee: Panasonic Corporation, Osaka (JP)

( * ) Notice: Subject to any disclaimer, the term of this patent is extended or adjusted under 35 U.S.C. 154(b) by 0 days.

(21) Appl. No.: 13/095,457

(22) Filed: Apr. 27, 2011

(65) Prior Publication Data

US 2011/0222792 A1    Sep. 15, 2011

Related U.S. Application Data

(63) Continuation of application No. PCT/JP2009/004108, filed on Aug. 26, 2009.

(30) Foreign Application Priority Data

Oct. 27, 2008   (JP) .................. 2008-275345

(51) Int. Cl.
*G06K 9/46* (2006.01)
*G06K 9/36* (2006.01)

(52) U.S. Cl. .................. 382/248; 382/232; 382/239

(58) Field of Classification Search .................. 382/100, 382/112, 171, 173, 176, 190, 199, 224, 232, 382/239, 248, 250, 254, 260, 261, 268, 270, 382/272; 358/1.9, 135, 426.01, 426.07, 426.11, 358/462, 465, 475, 504, 515, 523, 534, 539; 345/501; 706/52; 708/203; 375/240.12, 375/240.24, E07.243; 348/438.1, 606–624

See application file for complete search history.

(56) References Cited

U.S. PATENT DOCUMENTS

| | | | |
|---|---|---|---|
| 5,048,112 A | | 9/1991 | Alves et al. |
| 5,241,395 A | * | 8/1993 | Chen .................. 358/426.14 |
| 5,341,441 A | * | 8/1994 | Maeda et al. .................. 382/253 |
| 7,130,469 B2 | | 10/2006 | Adachi |
| 2004/0001632 A1 | | 1/2004 | Adachi |
| 2006/0115168 A1 | * | 6/2006 | Kobayashi .................. 382/239 |
| 2007/0121731 A1 | * | 5/2007 | Tanizawa et al. ......... 375/240.24 |
| 2010/0208802 A1 | * | 8/2010 | Tsukuba et al. ......... 375/240.12 |

FOREIGN PATENT DOCUMENTS

| | | |
|---|---|---|
| JP | 2003-317096 | 11/2003 |
| JP | 2007-110568 | 4/2007 |
| JP | 2008-004983 | 1/2008 |

* cited by examiner

*Primary Examiner* — Samir Ahmed
*Assistant Examiner* — Mehdi Rashidian
(74) *Attorney, Agent, or Firm* — McDermott Will & Emery LLP

(57) ABSTRACT

It is decided whether a processing target block includes an edge in accordance with an edge detection result of the processing target block. In the case where the edge is included, it is then detected whether there is a flat portion. It is decided whether the processing target block includes the flat portion in accordance with a flat portion detection result. In the case where the flat portion is included, one of a first group of orthogonal transform sizes is selected. In the case where the edge is not included or the flat portion is not included, one of a second group of orthogonal transform sizes greater than the first group of orthogonal transform sizes is selected.

11 Claims, 12 Drawing Sheets

F I G. 7
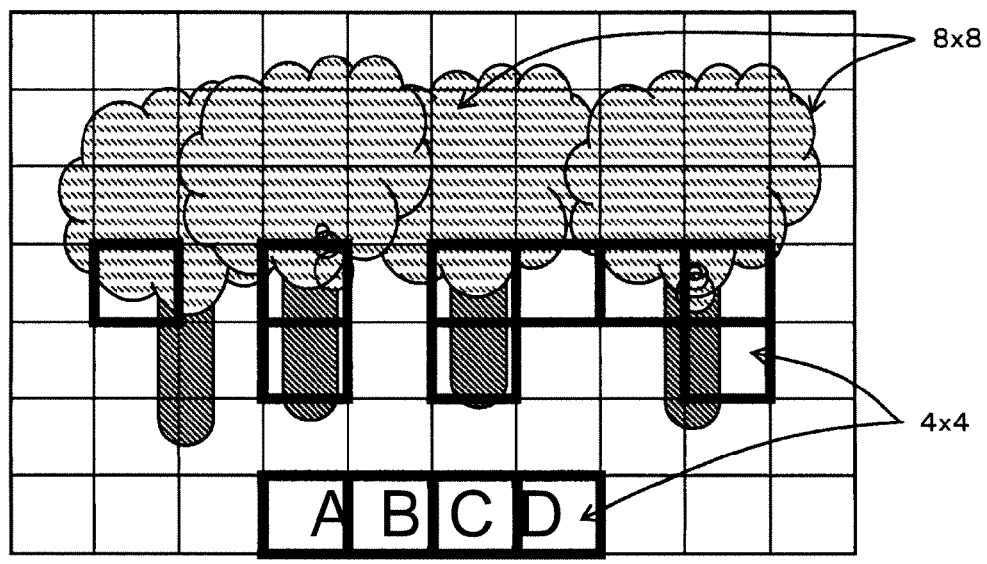
 block for which 8×8 orthogonal transform is selected
 block for which 4×4 orthogonal transform is selected F I G. 1 0
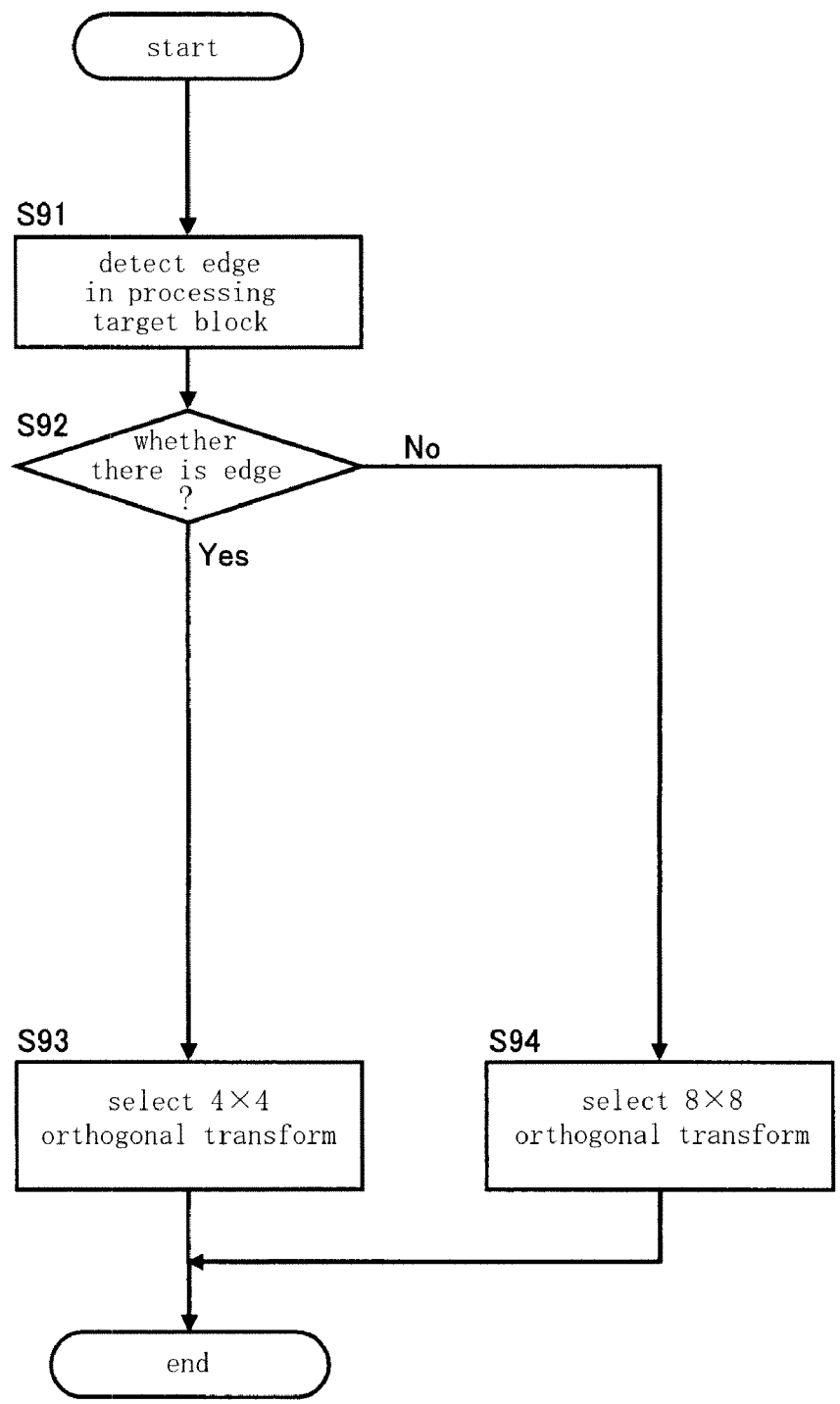

FIG. 11
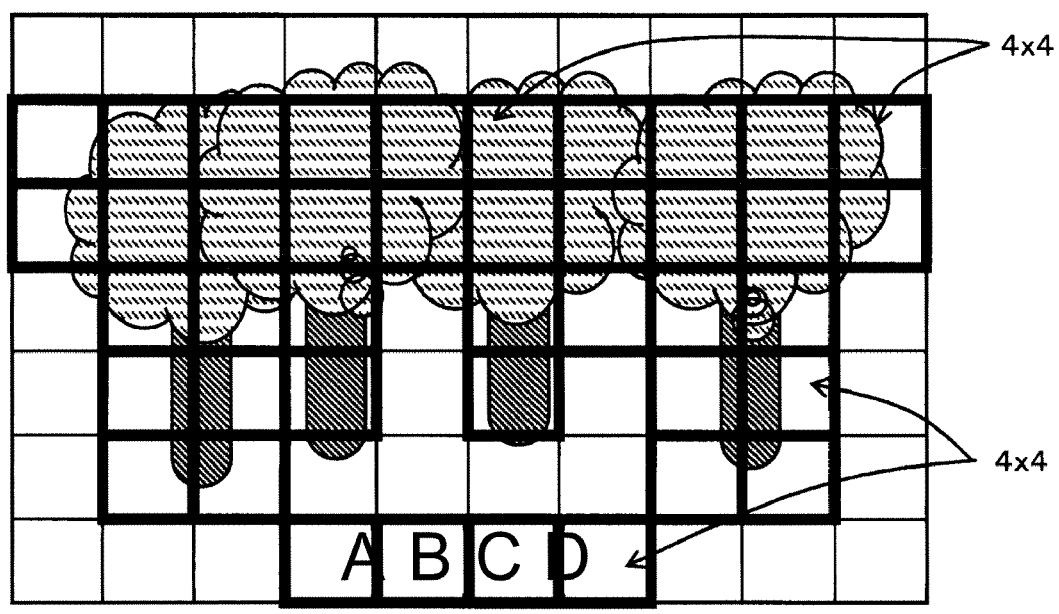
 block for which 8×8 orthogonal transform is selected
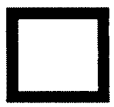 block for which 4×4 orthogonal transform is selected F I G. 1 2
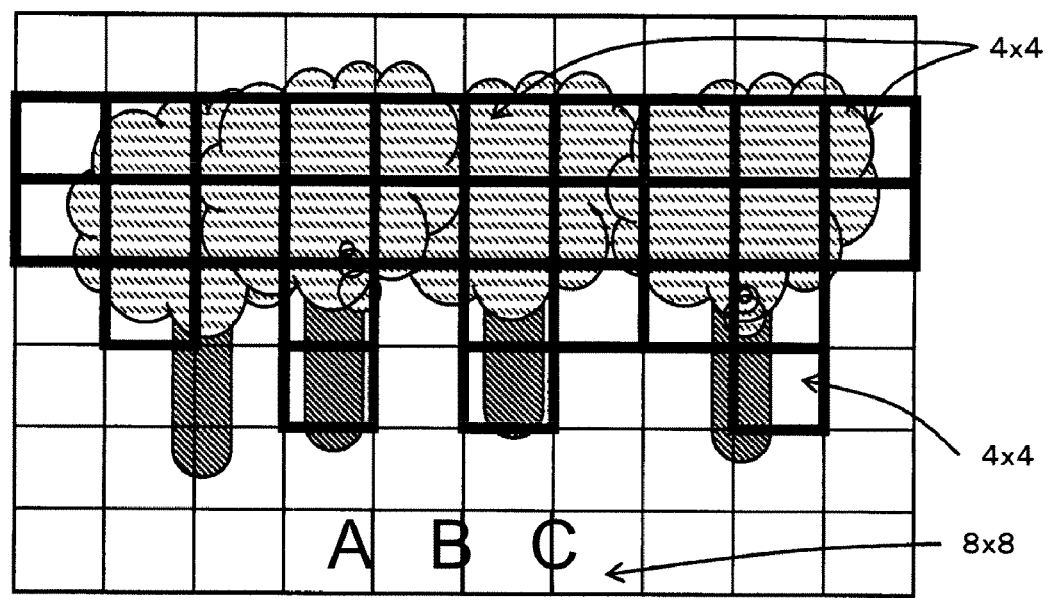
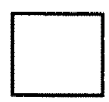 block for which 8×8 orthogonal transform is selected
 block for which 4×4 orthogonal transform is selected

METHOD FOR CODING IMAGE, IMAGE CODING DEVICE AND IMAGE PICKUP SYSTEM

RELATED APPLICATIONS

This application is a continuation under 35 U.S.C. 111(a) of International Application No. PCT/JP2009/004108, filed on Aug. 26, 2009, which in turn claims the benefit of Japanese Application No. 2008-275345, filed on Oct. 27, 2008, the disclosures of which Applications are incorporated by reference herein.

FIELD OF THE INVENTION

The present invention relates to a moving image coding technology wherein one of a plurality of orthogonal transform sizes (for example, 4×4 pixel block and 8×8 pixel block) is adaptively selected to code an image depending on what the image represents in order to increase a coding efficiency, accelerate a processing rate, and control deterioration of an image quality.

BACKGROUND OF THE INVENTION

The entire documents of Japanese patent application No. 2008-275345 filed on Oct. 27, 2008, which include the specification, drawings, and scope of claims, are incorporated herein by reference.

A conventional standard technology for coding moving image data is MPEG-4 Part 10: Advanced Video Coding (abbreviated as MPEG-4 AVC) defined by ISO/IEC JTC1 MPEG (Moving Picture Experts Groups). According to MPEG-4 AVC, one of 4×4 pixel block and 8×8 pixel block is suitably selected as a basic block size in orthogonal transform. The orthogonal transform per 4×4 pixels is characterized in that an extent of impact from quantization-induced noise is limited, whereas the orthogonal transform per 8×8 pixels is broadly affected by the noise though a complicated pattern of irregularity is thereby easily reproduced. When the orthogonal transform size is flexibly chosen depending on what an image represents for each of processing blocks, improvements can be expected in a coding efficiency and deterioration of an image quality in the image coding.

The Patent Document 1 discloses the quality improvement of block images including, for example, a character image such as a captioned image by flexibly changing the orthogonal transform size. When the block images including the character image, in which a pixel value variation has many sharp edges, are coded, mosquito noise is easily generated. To improve the image quality, the invention disclosed in the Patent Document 1 narrows an area where mosquito noise is diffusive by selecting the orthogonal transform per 4×4 pixels for the block images including the character image so that mosquito noise is less visually recognizable. The Patent Document 1, however, only discloses that the edge detection is a technique for selecting the orthogonal transform size, failing to describe in detail any specific embodiment of the selection technique.

The invention disclosed in the Patent Document 2 employs the edge detection to select the orthogonal transform size. FIG. 10 is a flow of processing steps for selecting the orthogonal transform size disclosed in the Patent Document 2. The processing steps for selecting the orthogonal transform size include an edge detection step S91 in which an edge of a processing target block is detected, an edge decision step S92 in which whether there is an edge in the processing target block is decided based on a detection result, a 4×4 pixel orthogonal transform selection step S93 in which the orthogonal transform per 4×4 pixels is selected after deciding that there is an edge, and an 8×8 pixel orthogonal transform selection step S94 in which the orthogonal transform per 8×8 pixels is selected after deciding that there is no edge.

FIG. 11 is an illustration of block images where the orthogonal transform per 4×4 pixels is selected when the orthogonal transform size selection technique disclosed in the Patent Document 2 is applied to images including a character image such as a captioned image. It is known from the illustration that the orthogonal transform per 4×4 pixels is selected in block images including character images (squares enclosed by solid lines).

The method disclosed in the Patent Document 2 has such a disadvantage that a coding volume significantly increases in the block images subjected to the orthogonal transform per 4×4 pixels in the case where a target block image has an intra prediction mode for intra-frame prediction. The coding volume of the block for which the orthogonal transform per 4×4 pixels is selected is thus increased because the intra-prediction block size changes depending on the orthogonal transform size. The disadvantage is described below.

Though the intra prediction is performed per 8×8 pixels in the orthogonal transform size of 8×8 pixels, the intra prediction is performed per 4×4 pixels or 16×16 pixels in the orthogonal transform size of 4×4 pixels.

The intra prediction per 8×8 pixels is performed in four 8×8 pixel blocks in a 16×16 pixel macro block, and the intra prediction modes of the four blocks are coded and stored in a macro block header region of an output bit stream after the image is coded.

In contrast, the intra prediction per 4×4 pixels is performed in 16 4×4 pixel blocks in the 16×16 pixel macro block, and the intra prediction modes of the 16 blocks are coded and stored in the macro block header region of the output bit stream after the image is coded. Thus, there are more intra prediction modes to be stored in the macro block header region, resulting in a great increase of the coding volume as compared to the intra prediction per 8×8 pixels.

PRIOR ART DOCUMENT

Patent Document

Patent Document 1: Unexamined Japanese Patent Applications Laid-Open No. 2008-4983
Patent Document 2: Unexamined Japanese Patent Applications Laid-Open No. 2007-110568

SUMMARY OF THE INVENTION

Problem to be Solved by the Invention

As illustrated in FIG. 11, the conventional method for selecting the orthogonal transform size selects the 4×4 orthogonal transform size not only for a character image but also for a block image with many edges including, for example, tree branches and leaves. As a result, the 4×4 orthogonal transform size is selected for a larger number of blocks, which leads to an increased coding volume.

Then, it is discussed how the number of blocks for which the 4×4 orthogonal transform size is selected can be reduced. A threshold value used in the edge detection or the edge decision may be adjusted to make it less likely that the 4×4 orthogonal transform size is selected. This, however, raises another problem; the 4×4 orthogonal transform size cannot be selected for any block image including a character image where deterioration of an image quality due to mosquito noise is desirably less conspicuous as illustrated in FIG. 12 ("AB-CDE" is no longer enclosed by square solid lines, meaning that the 8×8 orthogonal transform size is selected).

The present invention was accomplished to solve the conventional technical problem, and a main object thereof is to optimally select an orthogonal transform size for any block including a character image to thereby control deterioration of an image quality in the character image due to mosquito noise while preventing a coding volume from increasing.

Means for Solving the Problem

An image coding method using an image coding device according to the present invention is an image coding method characterized in that one of a plurality of orthogonal transform sizes is selected per block, and a coding target block image is coded by an orthogonal transform based on the selected orthogonal transform size, the image coding method including:

an edge detection step which detects an edge of the coding target block image and outputs a detection result thereby obtained as edge information;

an edge decision step which compares the edge information to an edge decision threshold value to decide whether there is the edge in the coding target block image;

a flat portion detection step which detects a flat portion in the coding target block image after the edge decision step decides that the coding target block image includes the edge and outputs a detection result thereby obtained as flat portion information;

a flat portion decision step which compares the flat portion information to a flat portion decision threshold value to decide whether there is the flat portion in the coding target block image;

a first orthogonal transform size selection step which divides the plurality of orthogonal transform sizes into a first group of orthogonal transform sizes including one or a plurality of orthogonal transform sizes and a second group of orthogonal transform sizes including one or a plurality of orthogonal transform sizes greater than the first group of orthogonal transform sizes, the first orthogonal transform size selection step further selecting an orthogonal transform based on one of the first group of orthogonal transform sizes for the coding target block image after the flat portion decision step decides that the coding target block image includes the flat portion; and a second orthogonal transform size selection step which selects an orthogonal transform based on one of the second group of orthogonal transform sizes for the coding target block image after the edge decision step decides that the coding target block image does not include the edge or after the flat portion decision step decides that the coding target block image does not include the flat portion.

According to the image coding method thus characterized, a requirement for selecting the orthogonal transform size is narrowed down by deciding whether there is a flat portion in addition to an edge. The orthogonal transform based on one of the first group of orthogonal transform sizes is selected for any processing target block where the edge and the flat portion are both present. The orthogonal transform based on one of the second group of orthogonal transform sizes is selected for any processing target block not including the edge, or any processing target block including the edge but not the flat portion. Thus, the orthogonal transform size can be optimally selected for any block including a character image. Such an advantageous image coding method can control deterioration of an image quality of the character image due to mosquito noise while preventing a coding volume from increasing.

According to a preferable mode of the image coding method, the first group of orthogonal transform sizes includes an orthogonal transform size of 4×4 pixels, the second group of orthogonal transform sizes includes an orthogonal transform size of 8×8 pixels, the first orthogonal transform size selection step selects an orthogonal transform based on the orthogonal transform size of 4×4 pixels, and the second orthogonal transform size selection step selects an orthogonal transform based on the orthogonal transform size of 8×8 pixels.

Because the edge is detected but the flat portion is not detected in any block image including, for example, tree branches and leaves, the orthogonal transform based on one of the first group of orthogonal transform sizes (for example, per 4×4 pixels) is not selected, but the orthogonal transform based on one of the second group of orthogonal transform sizes (for example, per 8×8 pixels) is selected for such a block image. Because the edge and the flat portion are both detected in any image including a character image, the orthogonal transform based on one of the first group of orthogonal transform sizes is selected. This technical characteristic can control the image quality deterioration of the character image due to mosquito noise while preventing the coding volume from increasing.

According to another preferable mode of the image coding method, the edge detection step calculates a differential absolute value of vertically and horizontally adjacent pixels in the coding target block image and detects the edge when the calculated differential absolute value is greater than an edge detection threshold value, and then outputs number of the detected edges as the edge information.

Because the edge detection is thus based on the differential absolute value of the vertically and horizontally adjacent pixels, a processing volume is lessened so that the edge can be more speedily detected.

According to still another preferable mode of the image coding method, the flat portion detection step calculates a differential absolute value of vertically and horizontally adjacent pixels in the coding target block image and detects the flat portion when the calculated differential absolute value is smaller than a flat portion detection threshold value, and then outputs number of the detected flat portions as the flat portion information.

Because the flat portion detection is thus based on the differential absolute value of the vertically and horizontally adjacent pixels, a processing volume is lessened so that the flat portion can be more speedily detected.

An image coding device according to the present invention is an image coding device characterized in that one of a plurality of orthogonal transform sizes is selected per block, and a coding target block image is coded by an orthogonal transform based on the selected orthogonal transform size, comprising:

an edge detection unit configured to detect an edge of the coding target block image and output a detection result thereby obtained as an edge information;

an edge decision unit configured to compare the edge information to an edge decision threshold value to decide whether there is the edge in the coding target block image;

a flat portion detection unit configured to detect a flat portion in the coding target block image and output a detection result thereby obtained as a flat portion information;

a flat portion decision unit configured to compare the flat portion information to a flat portion decision threshold value to decide whether there is the flat portion in the coding target block image; and an orthogonal transform size selection unit configured to select the orthogonal transform size, wherein the orthogonal transform size selection unit divides the plurality of orthogonal transform sizes into a first group of orthogonal transform sizes including one or a plurality of orthogonal transform sizes and a second group of orthogonal transform sizes including one or a plurality of orthogonal transform sizes greater than the first group of orthogonal transform sizes, the first orthogonal transform size selection step further selecting one of the first group of orthogonal transform sizes for the coding target block image after the edge decision unit decides that the coding target block image includes the edge and the flat portion decision unit decides that the coding target block image includes the flat portion, and the orthogonal transform size selection unit selects one of the second group of orthogonal transform sizes for the coding target block image after the edge decision step decides that the coding target block image does not include the edge or after the flat portion decision step decides that the coding target block image does not include the flat portion.

Effect of the Invention

According to the present invention, the requirement for selecting the orthogonal transform size is narrowed down by deciding whether there is a flat portion in addition to an edge. The present invention is technically characterized can optimally select the orthogonal transform size for any image block including, for example, a character image, thereby controlling deterioration of an image quality of the character image due to mosquito noise while preventing a coding volume from increasing. As a result, the image quality can be greatly improved in a subjective view.

BRIEF DESCRIPTION OF THE DRAWINGS

FIG. 7 is an illustration of a result of 4×4 orthogonal transform selection when a technique for selecting the orthogonal transform size in the imaging coding method according to the exemplary embodiment 1 is applied to an image.

FIG. 10 is a flow chart illustrating a conventional operation for selecting an orthogonal transform size.

FIG. 11 is an illustration of a result of 4×4 orthogonal transform selection when a conventional technique for selecting the orthogonal transform size is applied to an image.

FIG. 12 is an illustration of a result of 4×4 orthogonal transform selection when the conventional selection technique is applied to an image.

EXEMPLARY EMBODIMENTS FOR CARRYING OUT THE INVENTION

Figure 1:
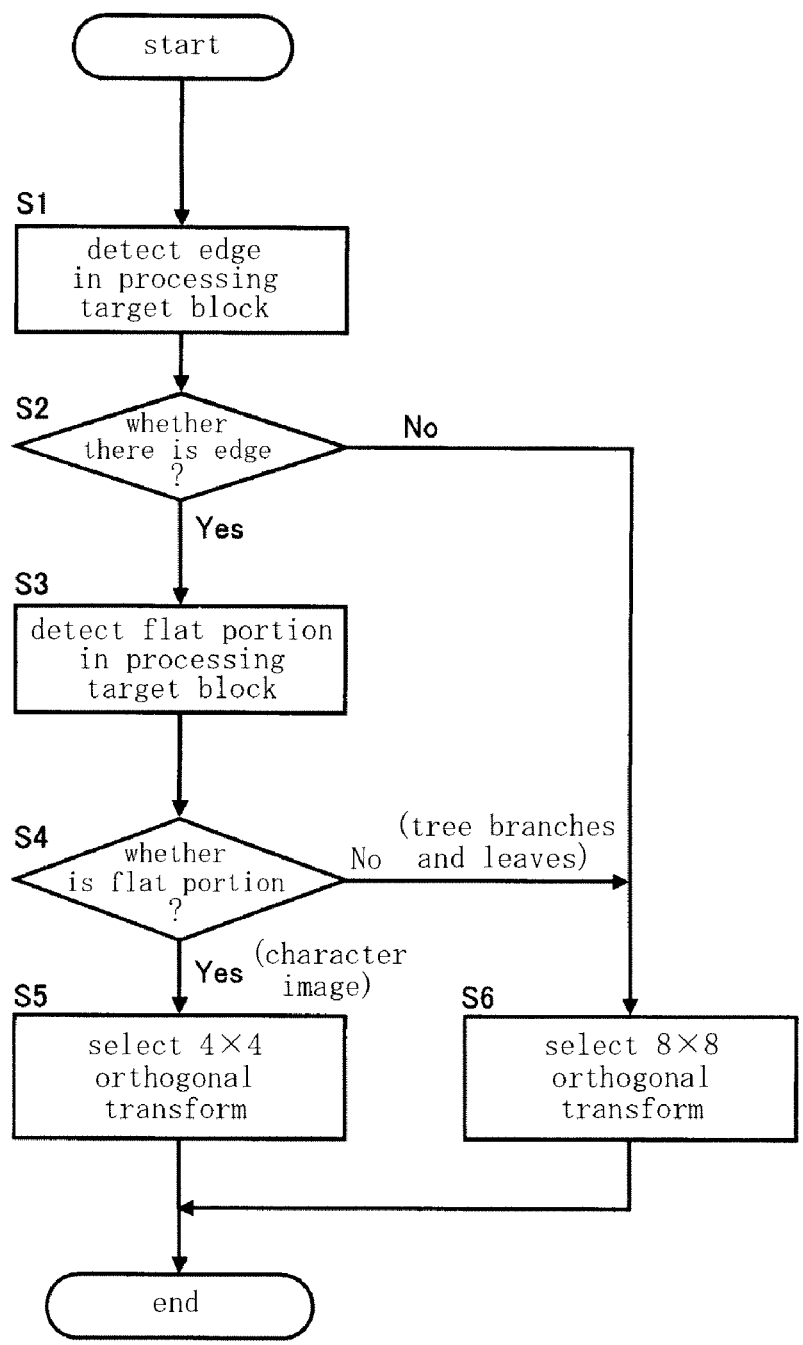
FIG. 1 is a flow chart illustrating an operation for selecting an orthogonal transform size in an image cording method according to an exemplary embodiment 1 of the present invention.

Hereinafter, exemplary embodiments of an image coding method and an image coding device according to the present invention are described in detail referring to the drawings.

Exemplary Embodiment 1

FIG. 1 is a flow chart illustrating processing steps for selecting an orthogonal transform size in an image cording method according to an exemplary embodiment 1 of the present invention. The processing steps for selecting the orthogonal transform size in the image coding method according to the exemplary embodiment 1 include an edge detection step S1, an edge decision step S2, a flat portion detection step S3, a flat portion decision step S4, a 4×4 orthogonal transform selection step S5, and an 8×8 orthogonal transform selection step S6.

In the edge detection step S1, an edge where a pixel value shows a precipitous change is detected. In the edge detection step S2, whether a processing target block includes the edge is decided based on a detection result obtained in the edge detection step S1. In the flat portion detection step S3, a flat portion where a pixel moderately changes is detected in the processing target block after the edge decision step S2 decides that the processing target block includes the edge. In the flat portion decision step S4, whether the processing target block includes the flat portion is decided based on a detection result obtained in the flat portion detection step S3. In the 4×4 orthogonal transform selection step S5, an orthogonal transform per 4×4 pixels is selected after the flat portion decision step S4 decides that the flat portion is included. In the 8×8 orthogonal transform selection step S6, an orthogonal transform per 8×8 pixels is selected after the edge decision step S2 decides that the processing target block does not include the edge and the flat portion decision step S4 decides that the processing target block does not include the flat portion. The unit of 4×4 pixels is one of orthogonal transform sizes constituting a first group of orthogonal transform sizes, and the unit of 8×8 pixels is one of orthogonal transform sizes constituting a second group of orthogonal transform sizes greater than the first group of orthogonal transform sizes. Though the present exemplary embodiment only provides a first group of orthogonal transform sizes and a second group of orthogonal transform sizes, there may be a plurality of first groups of orthogonal transform sizes and a plurality of second groups of orthogonal transform sizes.

In the edge detection step S1 which detects the edge where the pixel value shows a precipitous change, a differential absolute value of adjacent pixels may be used to detect the edge. More specifically, the differential absolute value of adjacent pixels is calculated, the presence of an edge is decided when the calculated differential absolute value is greater than an edge detection threshold value (Th1), and number of the detected edges (Cnt1) is counted.

Figure 2:
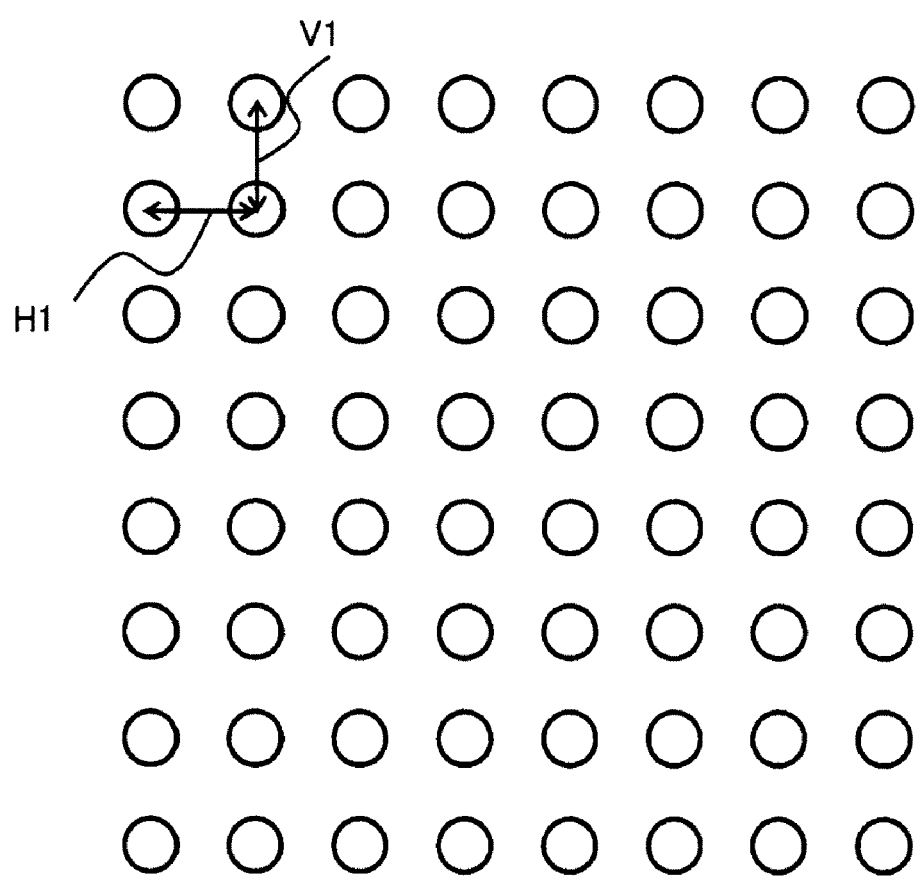
FIG. 2 illustrates a positional relationship of vertically and horizontally adjacent pixels from which a differential absolute value is calculated in the image cording method according to the exemplary embodiment 1.
Figure 3:
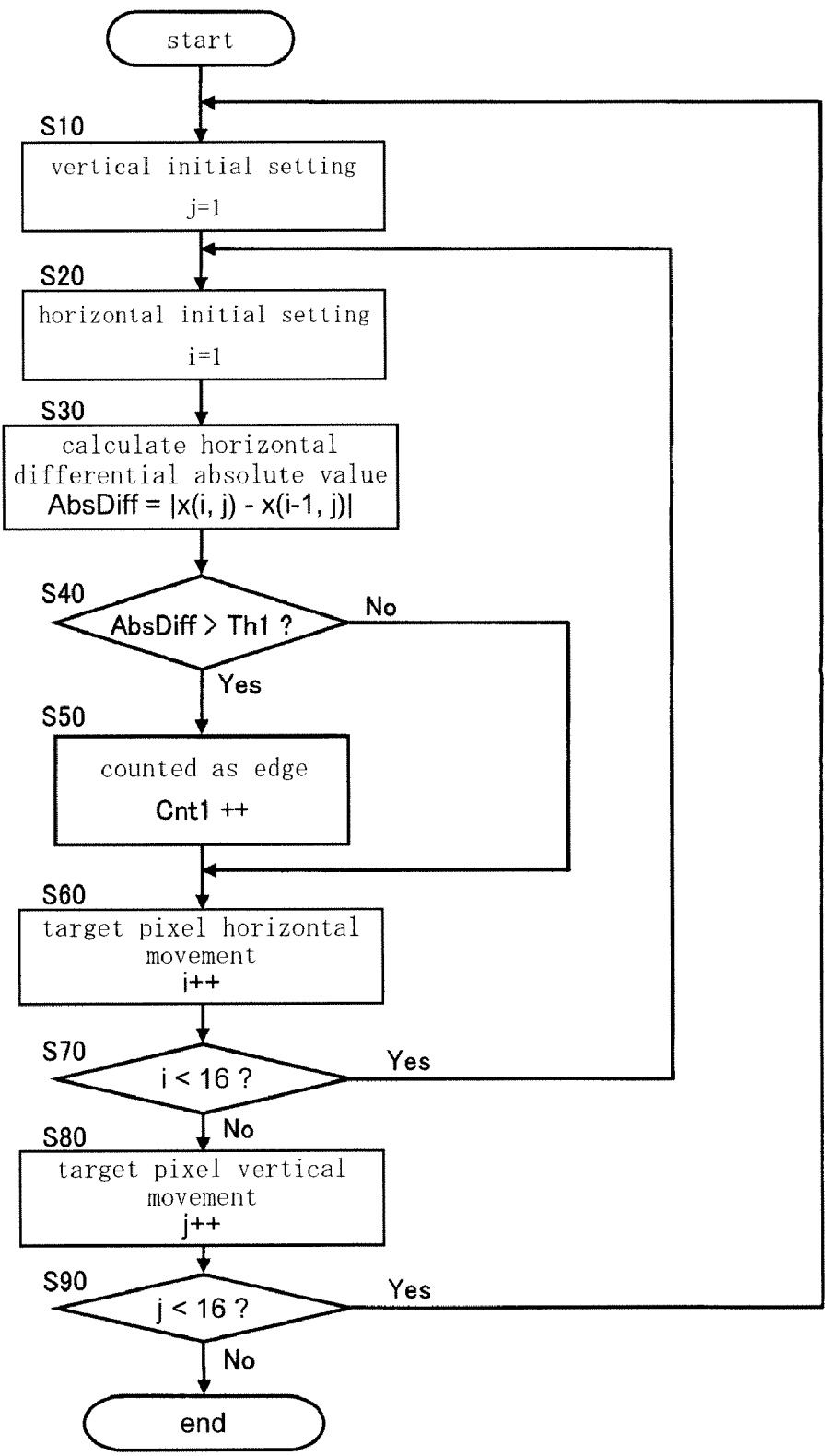
FIG. 3 is a flow chart illustrating an operation for horizontally detecting an edge in the image cording method according to the exemplary embodiment 1.

FIG. 2 illustrates a positional relationship of the adjacent pixels from which the differential absolute value is calculated. H1 represents a positional relationship of the adjacent pixels used to horizontally calculate the differential absolute value, and V1 represents a positional relationship of the adjacent pixels used to vertically calculate the differential absolute value. In Step S1, the horizontal and vertical differential absolute values are both calculated. FIG. 3 illustrates a flow of processing steps for horizontally detecting the edge wherein a target pixel for calculating the differential absolute value of the adjacent pixels is x (l, j). Hereinafter, the processing steps for horizontally detecting the edge are described in detail referring to FIG. 3.

The processing steps for horizontally detecting the edge include a vertical initial setting step S10 in which a vertical pixel position is initialized, a horizontal initial setting step S20 in which a horizontal pixel position is initialized, a horizontal differential absolute value calculation step S30 in which a horizontal differential absolute value (AbsDiff) is calculated, a differential absolute value comparison step S40 in which the horizontal differential absolute value (AbsDiff) is compared to the edge detection threshold value (Th1), an edge counting step S50 in which number of edges (Cnt1) is increased by 1 when the horizontal differential absolute value (AbsDiff) is greater than the edge detection threshold value (Th1), a target pixel horizontal movement step S60 in which the target pixel horizontally moves to a next pixel, a horizontal pixel position decision step S70 in which whether a horizontal component is smaller than a macro block size "16" is decided, a target pixel vertical movement step S80 in which the target pixel vertically moves to a next pixel, and a vertical pixel position decision step S90 in which whether a vertical component is smaller than the block size of the processing target block "16" is decided.

Figure 4:
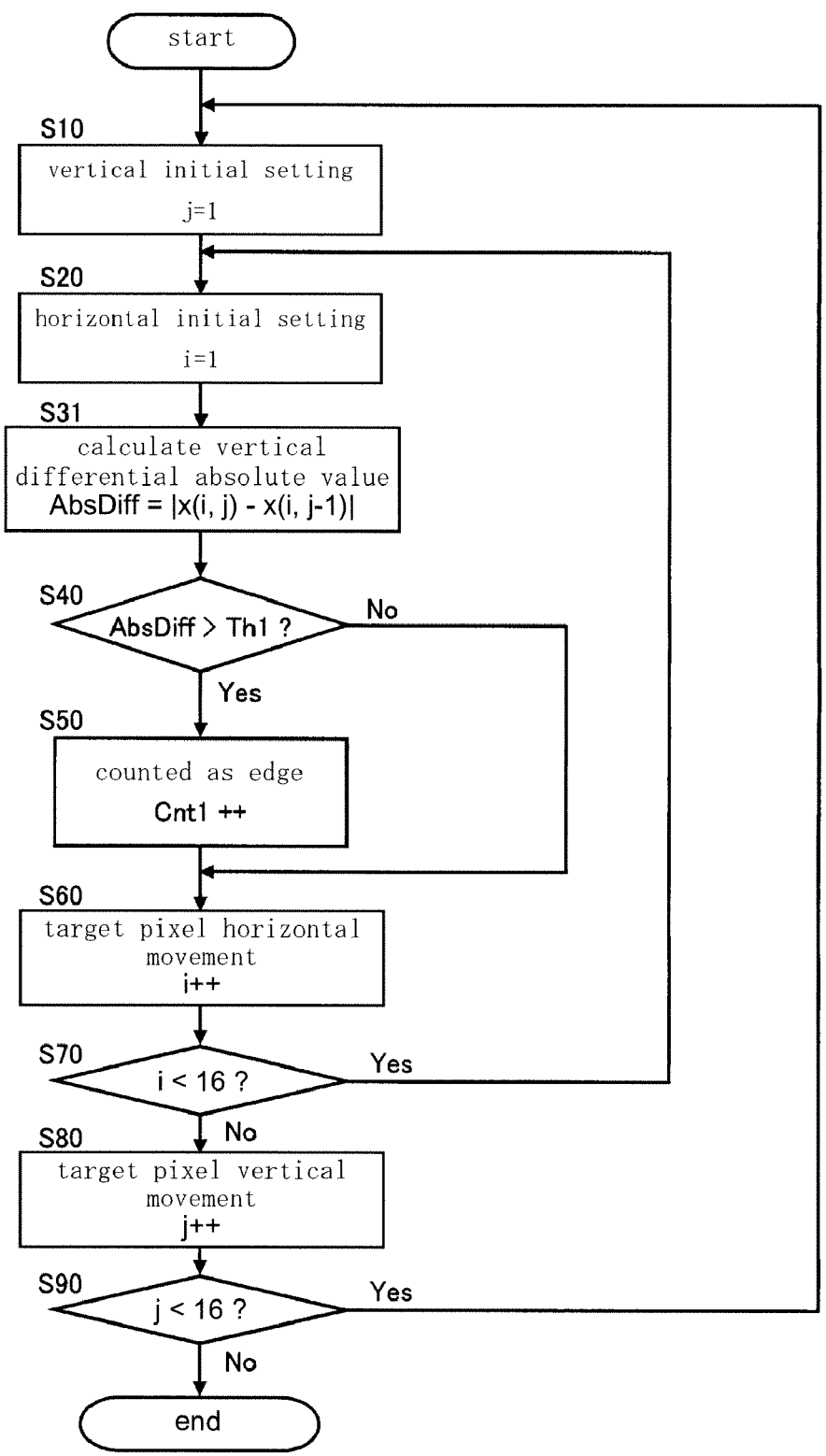
FIG. 4 is a flow chart illustrating an operation for vertically detecting an edge in the image cording method according to the exemplary embodiment 1.

FIG. 4 illustrates a flow of processing steps for vertically detecting the edge. Hereinafter, the processing steps for vertically detecting the edge are described in detail referring to FIG. 4. The processing steps for vertically detecting the edge include a vertical differential absolute value calculation step S31 which calculates the vertical differential absolute value in place of the horizontal differential absolute value calculation step S30 which calculates the horizontal differential absolute value. The edge detection is carried out horizontally and vertically so that the number of edges (Cnt1) in total horizontally and vertically detected in the target block is calculated.

The edge decision step S2 decides that the processing target block includes the edge when the number of edges (Cnt1) counted in the edge detection step S1 is greater than an edge decision threshold value (Th2) but decides that the processing target block does not include the edge when the number of edges (Cnt1) is smaller than the edge decision threshold value (Th2).

The flat portion detection step S3 detects a flat portion in which a pixel value shows a moderate change in the processing target block. To detect the flat portion, a different absolute value of adjacent pixels may be used similarly to the edge detection. More specifically, the differential absolute value of adjacent pixels is calculated, the presence of a flat portion is detected when the calculated differential absolute value is greater than a flat portion detection threshold value (Th3), and number of the detected flat portions (Cnt2) is counted.

Figure 5:
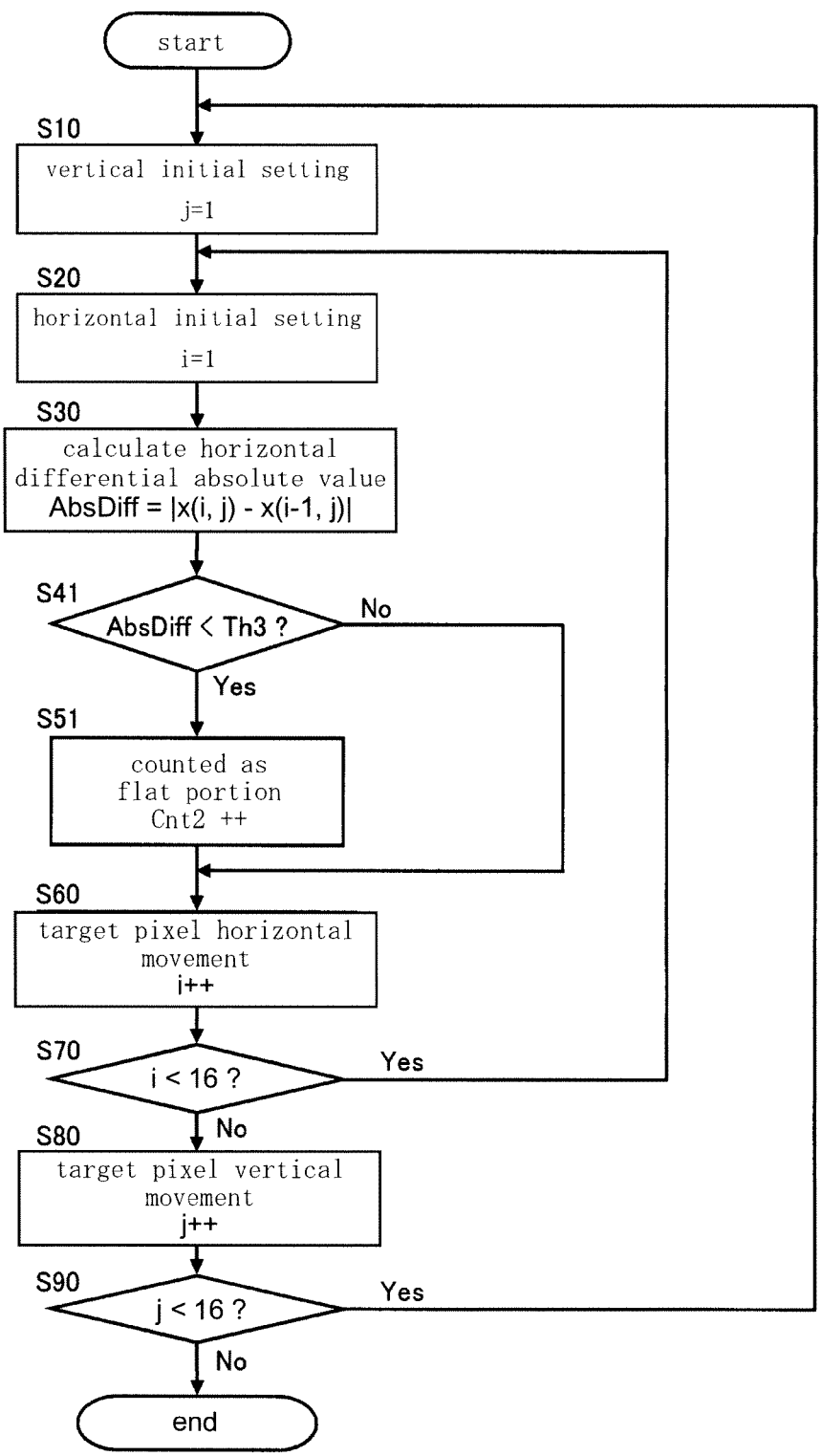
FIG. 5 is a flow chart illustrating an operation for horizontally detecting a flat portion in the image cording method according to the exemplary embodiment 1.

FIG. 5 illustrates a flow of processing steps for horizontally detecting the flat portion wherein a target pixel for calculating the differential absolute value of the adjacent pixels is x (l, j). Hereinafter, the processing steps for horizontally detecting the flat portion are described in detail referring to FIG. 5. The processing steps for horizontally detecting the flat portion include a vertical initial setting step S10 in which a vertical pixel position is initialized, a horizontal initial setting step S20 in which a horizontal pixel position is initialized, a horizontal differential absolute value calculation step S30 in which a horizontal differential absolute value (AbsDiff) is calculated, a differential absolute value comparison step S41 in which the horizontal differential absolute value (AbsDiff) is compared to the flat portion detection threshold value (Th3), a flat portion counting step S51 in which number of flat portions (Cnt2) is increased by 1 when the horizontal differential absolute value (AbsDiff) is smaller than the flat portion detection threshold value (Th3), a target pixel horizontal movement step S60 in which the target pixel horizontally moves to a next pixel, a horizontal pixel position decision step S70 in which whether a horizontal component is smaller than a macro block size "16" is decided, a target pixel vertical movement step S80 in which the target pixel vertically moves to a next pixel, and a vertical pixel position decision step S90 in which whether a vertical component is smaller than the block size of the processing target block "16" is decided.

Figure 6:
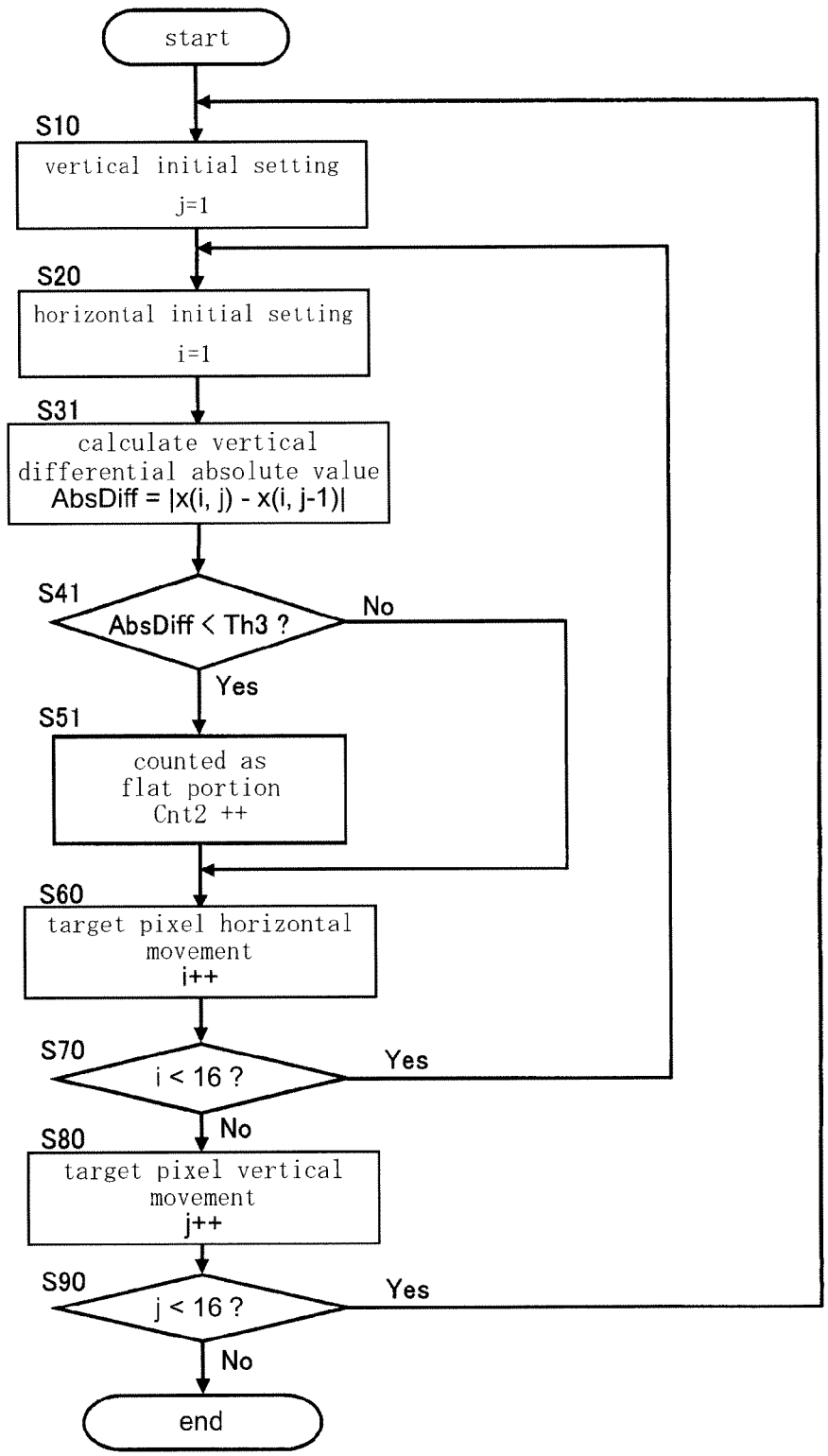
FIG. 6 is a flow chart illustrating an operation for vertically detecting a flat portion in the image cording method according to the exemplary embodiment 1.

FIG. 6 illustrates a flow of processing steps for vertically detecting the flat portion. Hereinafter, the processing steps for vertically detecting the flat portion are described in detail referring to FIG. 6. The processing steps for vertically detecting the flat portion include a vertical differential absolute value calculation step S31 which calculates a vertical differential absolute value in place of the horizontal differential absolute value calculation step S30 which calculates the horizontal differential absolute value in included in the processing steps for horizontally detecting the flat portion. The flat portion is detected horizontally and vertically so that the number of flat portions (Cnt2) in total horizontally and vertically detected in the target block is calculated.

The flat portion decision step S4 decides that the processing target block includes the flat portion when the number of flat portions counted in the flat portion detection step S3 is greater than a flat portion decision threshold value (Th4) but decides that the processing target block does not include the flat portion when the number of flat portions is smaller than the flat portion decision threshold value (Th4).

The unit of 4×4 pixels, which is one of the first group of orthogonal transform sizes, is selected as far as the edge and the flat portion are both included in the processing target block. The unit of 8×8 pixels, which is one of the second group of orthogonal transform sizes, is selected for any processing target block not including the edge and any processing target block including the edge but not the flat portion. This is a technical characteristic of the present exemplary embodiment distinctly different to the prior art.

In the case where there are a plurality of first groups of orthogonal transform sizes and a plurality of second groups of orthogonal transform sizes, an arbitrary unit of pixels may be selected from each of the first groups of orthogonal transform sizes and the second groups of orthogonal transform sizes According to the decision steps described so far, the first group of orthogonal transform sizes (for example, orthogonal transform size of 4×4 pixels) is not selected for a block image of, for example, tree branches and leaves where the edge is detected but the flat portion is not detected. However, the first group of orthogonal transform sizes (for example, orthogonal transform size of 4×4 pixels) can be selected for a block image including a character image where the edge and the flat portion are both detected.

FIG. 7 is an illustration of the orthogonal transform sizes resulting from the orthogonal transform selection method according to the exemplary embodiment 1. As a result of the processing steps for selecting the orthogonal transform size according to the present exemplary embodiment, one of the second group of orthogonal transform sizes (for example, orthogonal transform size of 8×8 pixels) is selected in any image block including the edge alone such as tree branches and leaves, whereas one of the first group of orthogonal transform sizes (for example, orthogonal first size of 4×4 pixels) is selected in any image block including a character image where the edge and the flat portion are both present. The first group of orthogonal transform sizes (for example, orthogonal first size of 4×4 pixels) is also selected in a part of the image block illustrating tree trunks. An area of the trees where the first group of orthogonal transform sizes is selected is significantly smaller than the illustration of FIG. 11 according to the prior art, resulting in reduction of a coding volume.

In the exemplary embodiment 1, the differential absolute value of the adjacent pixels is used to detect the edge and the flat portion. However, the present invention is not necessarily limited thereto.

Exemplary Embodiment 2

Figure 8:
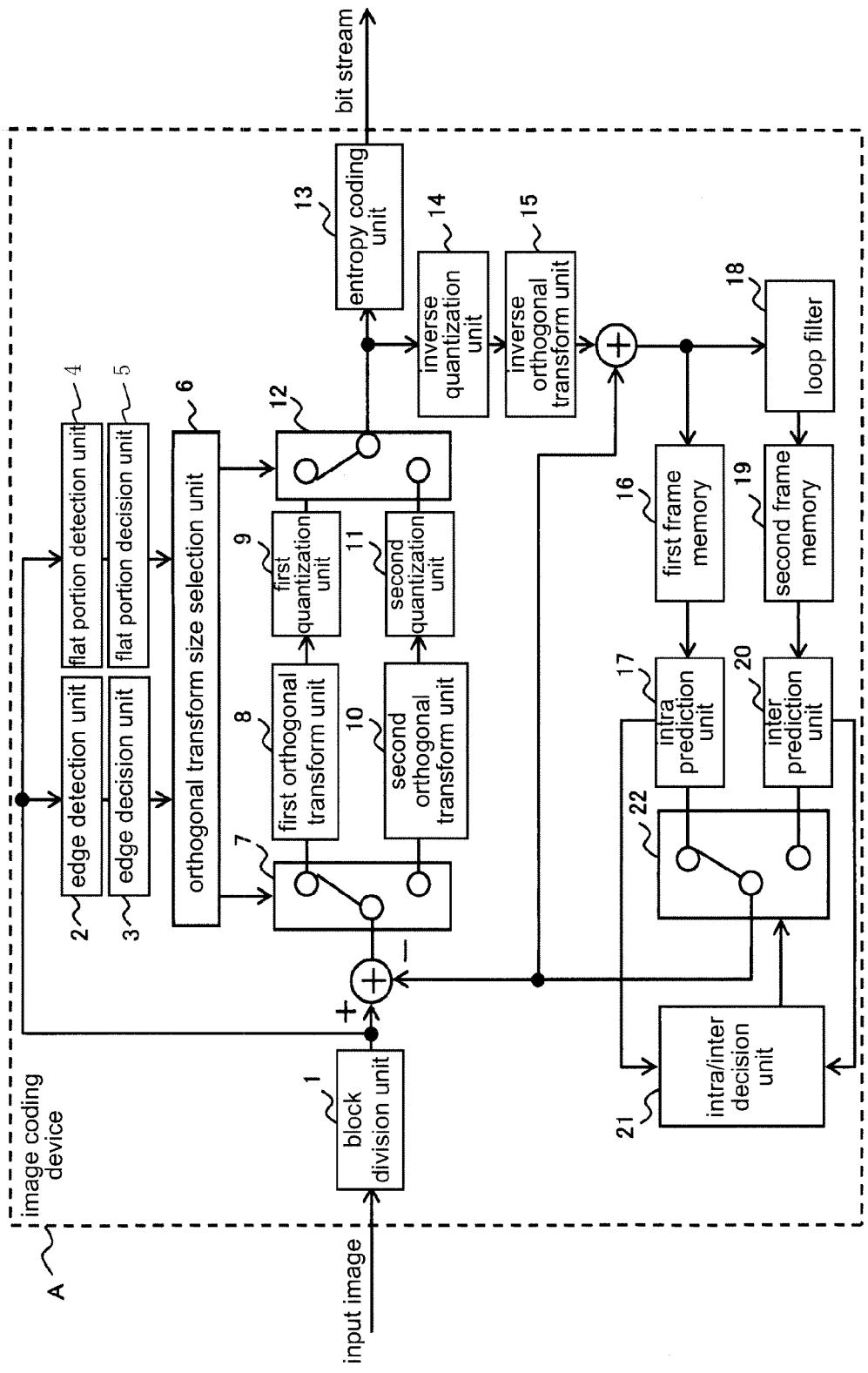
FIG. 8 is a block diagram illustrating a structure of an image coding device according to an exemplary embodiment 2 of the present invention.

FIG. 8 is a block diagram illustrating a structure of an image coding device A according to an exemplary embodiment 2 of the present invention. The image coding device A according to the exemplary embodiment 2 comprises a block division unit 1, an edge detection unit 2, an edge decision unit 3, a flat portion detection unit 4, a flat portion decision unit 5, an orthogonal transform size selection unit 6, a selector 7, a first orthogonal transform unit 8, a first quantization unit 9, a second orthogonal transform unit 10, a second quantization unit 11, a selector 12, an entropy coding unit 13, an inverse quantization unit 14, an inverse orthogonal transform unit 15, a first frame memory 16, an intra prediction unit 17, a loop filter 18 which applies deblocking filtering to image data, a second frame memory 19, an inter prediction unit 20, an intra/inter decision unit 21, and a selector 22.

The block division unit 1 divides an inputted image into blocks. The edge detection unit 2 detects an edge in the image blocks obtained by the block division unit 1 (target blocks to be coded), and outputs a detection result thereby obtained as an edge information. The edge detection is carried out by the edge detection unit 2 in a manner similar to the edge detection described in the exemplary embodiment 1.

The edge decision unit 3 compares the edge information outputted from the edge detection unit 2 to an edge decision threshold value to decide whether the block images include any edge. The flat portion detection unit 4 detects a flat portion in the image blocks obtained by the block division unit 1, and outputs a detection result thereby obtained as a flat portion information. The flat portion detection is carried out by the flat portion detection unit 4 in a manner similar to the flat portion detection described in the exemplary embodiment 1.

The flat portion decision unit 5 compares the flat portion information outputted from the flat portion detection unit 4 to a flat portion decision threshold value to decide whether the image blocks include any flat portion. The orthogonal transform size selection unit 6 selects an orthogonal transform size based on decision results obtained by the edge decision unit 3 and the flat portion decision unit 5. The selector 7 receives an instruction from the orthogonal transform size selection unit 6, and accordingly selects one of a 4×4 orthogonal transform size and an 8×8 orthogonal transform size. As a matter of course, the 4×4 orthogonal transform size is one of a first group of orthogonal transform sizes, and the 8×8 orthogonal transform size is one of a second group of orthogonal transform sizes.

The first orthogonal transform unit 8 orthogonally transforms the image blocks per 4×4 pixels. The first quantization unit 9 quantizes a transform coefficient obtained by the first orthogonal transform unit 8. The second orthogonal transform unit 10 orthogonally transforms the image blocks per 8×8 pixels. The second quantization unit 11 quantizes a transform coefficient obtained by the second orthogonal transform unit 10. The selector 12 selects one of outputs from the first quantization unit 9 and the second quantization unit 11. The entropy coding unit 13 codes the quantized coefficient outputted from the selector 12.

The inverse quantization unit 14 inversely quantizes the quantized coefficient outputted from the selector 12. The inverse orthogonal transform unit 15 applies an inverse orthogonal transform to a transform coefficient obtained by the inverse quantization unit 14. The first frame memory 16 stores therein an image data obtained by adding a predicted image data to the image data obtained by the inverse orthogonal transform unit 15.

The intra prediction unit 17 carries out an intra prediction using intra-frame pixels stored in the first frame memory 16. The loop filter 18 applies a deblocking filtering to the image data obtained by adding the predicted image data to the image data obtained by the inverse orthogonal transform unit 15 to remove any block noise. The second frame memory 19 stores therein the image data to which deblocking filtering was applied by the loop filter 18.

The inter prediction unit 20 carries out an inter-frame prediction by referencing the image data stored in the second frame memory 19. The intra/inter decision unit 21 makes an intra/inter decision based on the information obtained by the intra prediction unit 17 and the information obtained by the inter prediction unit 20. The selector 22 selects one of the predicted image data obtained by the intra prediction unit 17 and the predicted image data obtained by the inter prediction unit 20 based on a decision result obtained by the intra/inter decision unit 21.

In the imaging coding device, the orthogonal transform size selection unit 6 is configured to select the orthogonal transform size in accordance with the processing steps described in the exemplary embodiment 1. The present exemplary embodiment 1 selects one of the first group of orthogonal transform sizes (for example, 4×4 orthogonal transform size) in, for example, a character image alone where mosquito noise is conspicuous, thereby preventing a coding volume from increasing.

An LSI, which is a semiconductor integrated circuit, typically constitutes the image coding device A. The respective elements may be separately configured into a chip, or part or all of them may be collectively configured into a chip. The device is simply called LSI in the present exemplary embodiment, however, may be differently called depending on the degree of integration, for example, IC, system LSI, super LSI, or ultra LSI.

The LSI is not the only option to configure the device as an integrated circuit. Other examples are; dedicated circuit, general-purpose processor, FPGA (Field Programmable Gate Array) programmable after the production of LSI, and reconfigurable processor capable of reconfiguring connections and settings of circuit cells of LSI.

When a novel integration technique which replaces LSI is launched by future advancement of the current semiconductor technology or a novel integration technique developed from the current technology, the functional blocks may be integrated by the novel technique. The application of bio technology is another possible option.

Exemplary Embodiment 3

Next, an exemplary embodiment 3 is described. The present exemplary embodiment describes an imaging system (video system) such as a digital still camera or a camera used in a television conference system to which the moving image coding method described so far is applied.

Figure 9:
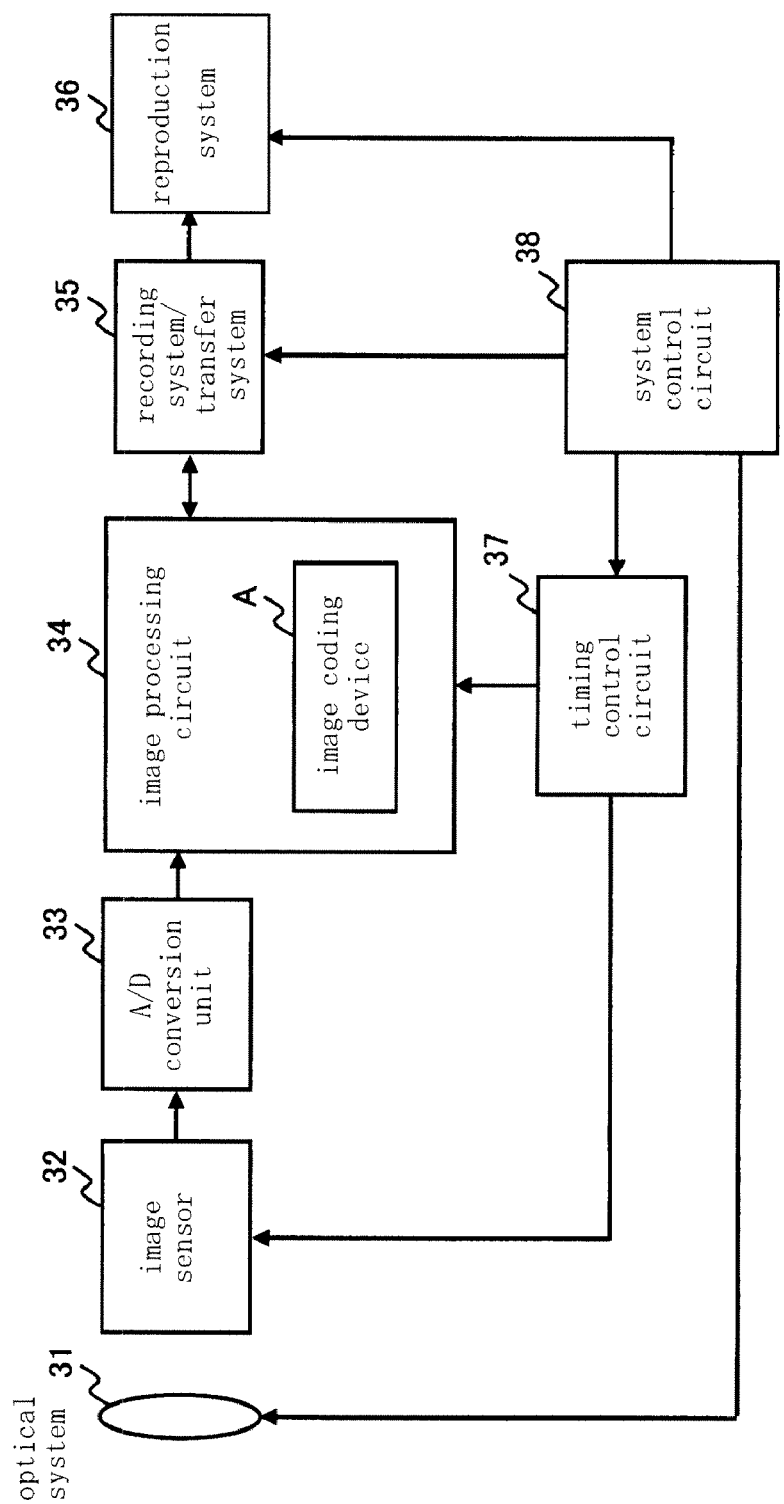
FIG. 9 is a block diagram illustrating a structure of an imaging system according to an exemplary embodiment 3 of the present invention.

FIG. 9 is a block diagram illustrating a structure of an imaging system according to the exemplary embodiment 3. In the imaging system, an incident image light passing through an optical system 31 is image-formed on an image sensor 32 and then photoelectrically converted. An electrical signal obtained by the photoelectric conversion is converted into a digital value by an A/D conversion circuit 33 and supplied to, for example, an image processing circuit 34 including an image coding device A illustrated in FIG. 8. The image processing circuit 34 executes signal processes such as Y/C process, edge process, image enlargement or reduction, image compression/extension such as MPEG/JPEG (Joint Photographic Experts Group), stream control of the compressed image. The image coding device A is structurally similar to the image coding device A described in the exemplary embodiment 2.

The signal image-processed in the imaging system is recorded on a medium or transferred through the Internet by a recording system/transfer system 35. The recorded or transferred signal is reproduced by a reproduction system 36. The image sensor 32 and the image processing circuit 34 are controlled by a timing control circuit 37. The optical system 31, recording system/transfer system 35, reproduction system 36, and timing control circuit 37 are controlled by a system control circuit 38.

In the description of the camera of the imaging system illustrated in FIG. 9, the image light entering through the optical system 31 is photoelectrically converted by the image sensor 32 and inputted to the A/D conversion circuit 33, however, the present invention is not necessarily limited thereto. An analog video input of an AV device such as a television may be directly inputted to the A/D conversion circuit 33.

In exemplary embodiment 1, the flat portion decision step S4 decides that the processing target block includes the flat portion after edge decision step S2 decides that the processing target block includes the edge portion. However, it is also possible to replace the steps about the edge (steps S1 and S2) and the steps about the flat portion (steps S3 and S4). That is, the edge decision step S2 decides that the processing target block includes the edge portion after flat portion decision step S4 decides that the processing target block includes the flat portion.

INDUSTRIAL APPLICABILITY

The technology accomplished by the present invention narrows down a requirement for selecting one of a plurality of orthogonal transform sizes by deciding whether there is a flat portion in addition to an edge, thereby optimally selecting the orthogonal transform size for any image block including a character image. The technology further controls deterioration of an image quality of the character image due to mosquito noise while controlling increase of a coding volume. The technology thus advantageous is very useful in an image coding technique for a television conference system in which the character image desirably has a better image quality.

DESCRIPTION OF REFERENCE SYMBOLS

A image coding device
1 block division unit
2 edge detection unit
3 edge decision unit
4 flat portion detection unit
5 flat portion decision unit
6 orthogonal transform size selection unit
7 selector
8 first orthogonal transform unit
9 first quantization unit
10 second orthogonal transform unit
11 second quantization unit
12 selector
13 entropy coding unit
14 inverse quantization unit
15 inverse orthogonal transform unit
16 first frame memory
17 intra prediction unit
18 loop filter
19 second frame memory
20 inter prediction unit
21 intra/inter decision unit
22 selector
31 optical system
32 image sensor
33 A/D conversion unit
34 image processing circuit
35 recording system/transfer system
36 reproduction system
37 timing control circuit
38 system control circuit
S1 edge detection step
S2 edge decision step
S3 flat portion detection step
S4 flat portion decision step
S5 4×4 orthogonal transform selection step
S6 8×8 orthogonal transform selection step
S10 vertical initial setting step
S20 horizontal initial setting step
S30 horizontal differential absolute value calculation step
S31 vertical differential absolute value calculation step
S40 differential absolute value comparison step
S41 differential absolute value comparison step
S50 edge counting step
S51 flat portion counting step
S60 target pixel horizontal movement step
S70 horizontal pixel position decision step
S80 target pixel vertical movement step
S90 vertical pixel position decision step

What is claimed is:

1. An image coding method using an image coding device, in which one of a plurality of orthogonal transform sizes is selected per block, and a coding target block image is coded by an orthogonal transform based on the selected orthogonal transform size, the image coding method including:
    an edge detection step which detects an edge of the coding target block image and outputs a detection result thereby obtained as edge information;

an edge decision step which compares the edge information to an edge decision threshold value to decide whether there is the edge in the coding target block image;

a flat portion detection step which detects a flat portion in the coding target block image after the edge decision step decides that the coding target block image includes the edge and outputs a detection result thereby obtained as flat portion information;

a flat portion decision step which compares the flat portion information to a flat portion decision threshold value to decide whether there is the flat portion in the coding target block image;

a first orthogonal transform size selection step which divides the plurality of orthogonal transform sizes into a first group of orthogonal transform sizes including one or a plurality of orthogonal transform sizes and a second group of orthogonal transform sizes including one or a plurality of orthogonal transform sizes greater than the first group of orthogonal transform sizes, the first orthogonal transform size selection step further selecting an orthogonal transform based on one of the first group of orthogonal transform sizes for the coding target block image after the flat portion decision step decides that the coding target block image includes the flat portion; and a second orthogonal transform size selection step which selects an orthogonal transform based on one of the second group of orthogonal transform sizes for the coding target block image after the edge decision step decides that the coding target block image does not include the edge or after the flat portion decision step decides that the coding target block image does not include the flat portion.

2. The image coding method as claimed in claim 1, wherein
the first group of orthogonal transform sizes includes an orthogonal transform size of 4×4 pixels,
the second group of orthogonal transform sizes includes an orthogonal transform size of 8×8 pixels,
the first orthogonal transform size selection step selects an orthogonal transform based on the orthogonal transform size of 4×4 pixels, and
the second orthogonal transform size selection step selects an orthogonal transform based on the orthogonal transform size of 8×8 pixels.

3. The image coding method as claimed in claim 1, wherein the edge detection step calculates a differential absolute value of vertically and horizontally adjacent pixels in the coding target block image and detects the edge when the calculated differential absolute value is greater than the edge detection threshold value, and then outputs number of the detected edges as the edge information.

4. The image coding method as claimed in claim 1, wherein
the flat portion detection step calculates a differential absolute value of vertically and horizontally adjacent pixels in the coding target block image and detects the flat portion when the calculated differential absolute value is smaller than the flat portion detection threshold value, and then outputs number of the detected flat portions as the flat portion information.

5. An image coding device in which one of a plurality of orthogonal transform sizes is selected per block, and a coding target block image is coded by an orthogonal transform based on the selected orthogonal transform size, the image coding device comprising:

an edge detection unit configured to detect an edge of the coding target block image and output a detection result thereby obtained as edge information;

an edge decision unit configured to compare the edge information to an edge decision threshold value to decide whether there is the edge in the coding target block image;

a flat portion detection unit configured to detect a flat portion in the coding target block image and output a detection result thereby obtained as flat portion information;

a flat portion decision unit configured to compare the flat portion information to a flat portion decision threshold value to decide whether there is the flat portion in the coding target block image; and an orthogonal transform size selection unit configured to select the orthogonal transform size, wherein:

the orthogonal transform size selection unit divides the plurality of orthogonal transform sizes into a first group of orthogonal transform sizes including one or a plurality of orthogonal transform sizes and a second group of orthogonal transform sizes including one or a plurality of orthogonal transform sizes greater than the first group of orthogonal transform sizes, the orthogonal transform size selection unit being further configured for selecting one of the first group of orthogonal transform sizes for the coding target block image after the edge decision unit decides that the coding target block image includes the edge and the flat portion decision unit decides that the coding target block image includes the flat portion, and the orthogonal transform size selection unit selects one of the second group of orthogonal transform sizes for the coding target block image after the edge decision unit decides that the coding target block image does not include the edge or after the flat portion decision unit decides that the coding target block image does not include the flat portion.

6. The image coding device as claimed in claim 5, wherein
the first group of orthogonal transform sizes includes an orthogonal transform size of 4×4 pixels,
the second group of orthogonal transform sizes includes an orthogonal transform size of 8×8 pixels,
the first orthogonal transform size selection unit selects an orthogonal transform based on the orthogonal transform size of 4×4 pixels, and
the second orthogonal transform size selection unit selects an orthogonal transform based on the orthogonal transform size of 8×8 pixels.

7. The image coding device as claimed in claim 5, wherein
the edge detection unit calculates a differential absolute value of vertically and horizontally adjacent pixels in the coding target block image and detects the edge when the calculated differential absolute value is greater than the edge detection threshold value, and then outputs number of the detected edges as the edge information to the edge decision unit.

8. The image coding device as claimed in claim 5, wherein
the flat portion detection unit calculates a differential absolute value of vertically and horizontally adjacent pixels in the coding target block image and detects the flat portion when the calculated differential absolute value is smaller than the flat portion detection threshold value, and then outputs number of the detected flat portions as the flat portion information to the flat portion decision unit.

9. An imaging system, comprising:
  an image processing circuit configured to code an image based on the image coding method as claimed in claim 1;
  an image sensor configured to output an image signal to the image processing circuit; and
  an optical system configured to image-form an optical image of a photographic subject on the image sensor.

10. An imaging system, comprising:
  an image processing circuit including the image coding device as claimed in claim 5 and configured to code an image;
  an image sensor configured to output an image signal to the image processing circuit; and
  an optical system configured to image-form an optical image of a photographic subject on the image sensor.

11. An image coding method using an image coding device in which one of a plurality of orthogonal transform sizes is selected per block, and a coding target block image is coded by an orthogonal transform based on the selected orthogonal transform size, the image coding method including:
  a flat portion detection step which detects a flat portion in the coding target block image and outputs a detection result thereby obtained as flat portion information;
  a flat portion decision step which compares the flat portion information to a flat portion decision threshold value to decide whether there is the flat portion in the coding target block image;
  an edge detection step which detects an edge of the coding target block image after the flat portion decision step decides that the coding target block image includes the flat portion and outputs a detection result thereby obtained as edge information;
  an edge decision step which compares the edge information to an edge decision threshold value to decide whether there is the edge in the coding target block image;
  a first orthogonal transform size selection step which divides the plurality of orthogonal transform sizes into a first group of orthogonal transform sizes including one or a plurality of orthogonal transform sizes and a second group of orthogonal transform sizes including one or a plurality of orthogonal transform sizes greater than the first group of orthogonal transform sizes, the first orthogonal transform size selection step further selecting an orthogonal transform based on one of the first group of orthogonal transform sizes for the coding target block image after the edge portion decision step decides that the coding target block image includes the edge portion; and
  a second orthogonal transform size selection step which selects an orthogonal transform based on one of the second group of orthogonal transform sizes for the coding target block image after the flat portion decision step decides that the coding target block image does not include the flat portion or after the edge portion decision step decides that the coding target block image does not include the edge.

* * * * *